United States Patent [19]

Phelps et al.

[11] Patent Number: 5,150,754

[45] Date of Patent: Sep. 29, 1992

[54] AQUEOUS AND PETROLEUM GEL METHOD FOR PREVENTING WATER-INFLUX

[75] Inventors: Craig H. Phelps, Kern County, Calif.; E. Thomas Strom, Dallas, Tex.

[73] Assignee: Mobil Oil Corporation, Fairfax, Va.

[21] Appl. No.: 706,438

[22] Filed: May 28, 1991

[51] Int. Cl.⁵ ............................................. E21B 33/138
[52] U.S. Cl. ..................................... 166/294; 166/295
[58] Field of Search ............ 166/294, 295, 300, 305.1, 166/269, 270, 274

[56] References Cited

U.S. PATENT DOCUMENTS

| | | | |
|---|---|---|---|
| 2,270,006 | 1/1942 | Kennedy | 166/294 |
| 2,708,974 | 5/1955 | Fischer et al. | 166/294 |
| 2,906,338 | 9/1959 | Shook | 166/15 |
| 2,978,024 | 4/1961 | Davis | 166/15 |
| 3,064,730 | 11/1962 | Malone et al. | 166/15 |
| 3,237,690 | 3/1966 | Karp et al. | 166/29 |
| 3,368,624 | 2/1968 | Heuer, Jr. et al. | 166/29 |
| 3,386,514 | 6/1968 | Weber | 166/294 X |
| 3,498,380 | 3/1970 | Sparlin et al. | 166/278 |
| 3,923,100 | 12/1975 | Bellos et al. | 166/294 X |
| 3,939,912 | 2/1976 | Sparlin et al. | 166/295 |
| 4,716,966 | 1/1988 | Shu | 166/295 |
| 5,002,127 | 3/1991 | Dalrymple et al. | 166/294 X |
| 5,067,564 | 11/1991 | Sydansk | 166/294 X |

*Primary Examiner*—Stephen J. Novosad
*Attorney, Agent, or Firm*—A. J. McKillop; C. J. Speciale; C. A. Malone

[57] ABSTRACT

A method to prevent damage to a water-sensitive hydrocarbonaceous fluid-producing zone of a formation which is penetrated by a well which has a water-influx problem. A gellable petroleum mixture is injected into the well where it forms a solid hydrophobic gel in situ sufficient to temporarily close pores in the water-sensitive zone. The mixture is allowed to remain in the water-sensitive zone for a time sufficient to form a solid gel so as to preclude fluid entry into the water-sensitive zone. Afterwards, an aqueous based gel mixture is injected into the water-influx zone where it forms a solid hydrophilic gel which is substantially stable thereby precluding fluid entry into the well. Subsequently, the solid petroleum gel degrades at formation conditions and opens the water-sensitive zone to production of hydrocarbonaceous fluids. Thereafter, substantially water-free hydrocarbonaceous fluids are produced from the water-sensitive zone.

5 Claims, 2 Drawing Sheets

AQUEOUS AND PETROLEUM GEL METHOD FOR PREVENTING WATER-INFLUX

FIELD OF THE INVENTION

This invention relates to the production of hydrocarbons from a hydrocarbon-bearing formation. More particularly, this invention relates to controlling the ratio of water produced via a well from a subsurface formation which has a hydrocarbon-bearing portion and another water-bearing portion.

BACKGROUND OF THE INVENTION

In the production of hydrocarbons from a hydrocarbon-bearing formation there is normally provided a well which extends from the surface of the earth into the formation. The hydrocarbon-bearing portion of the formation may be overlain or underlaid by a water-bearing portion of the formation.

The well may be completed by employing conventional completion practices such as running a cement casing in the well and forming perforations through the casing and cement sheaths around the casing, thereby forming an open production interval which communicates with the formation.

In the case of a hydrocarbon-bearing formation it is normally desirable to form the open production interval so that it communicates with the hydrocarbon-bearing portion of the formation but does not extend into and communicate with the water-bearing portion. However, the open production interval which is formed in the well may inadvertently communicate with a water-bearing portion which is completed in the same wellbore as the hydrocarbon-bearing portion of the formation.

Even if there is no actual initial fluid communication between the open production interval and the water-bearing portions of the formation, such communication may develop during production of hydrocarbon from the hydrocarbon-bearing portion of the formation. For example, water may be drawn upwardly from the water-bearing portion into the oil-bearing portion about the well. This phenomenon is known as water coning. In the case of water coning, free water is produced in the well which results in a much higher water-to-oil ratio in the production stream than would be the case without the water coning. The higher water-to-oil ratio is undesirable and results in increased operating costs.

Various techniques have been employed to counteract the effects of water coning or water-influx. One such technique involves completing the production well by providing an open production interval which communicates with the hydrocarbon-bearing portion of the formation but that does not communicate with the water-bearing portion which may overlie or underlie the hydrocarbon-bearing portion of the formation. The well may then be produced at a sufficiently low rate that coning of water into the hydrocarbon-bearing formation and about the well is avoided. However, such production rates may be lower than are otherwise desirable.

Other methods which may be employed to reduce the effects of water coning include placing of barriers within the subsurface formations penetrated by wells. One method of preventing water flow into oil wells involves creating a substantially horizontal barrier which extends radially and outwardly from the well into the oil zone of the oil-bearing formation. The barrier is located between the perforations through which oil flows into the well and the zone of the fluid which is to be blocked. The flow of water into the perforations is restricted by the barrier. Portland cement is commonly used as a barrier-forming material. For various reasons, however, substantial water may flow through or around these barriers to the perforations through which the oil is produced into the well. U.S. Pat. No. 3,237,690 to Jacy C. Karp et al. is directed to the creation in an oil zone of a thin, substantially horizontal, highly impermeable barrier of portland cement which is bound by strata of the formation which have had their permeability permanently destroyed by a plugging material.

A method of forming a plastic pancake barrier between an oil and water zone is described in *The Oil and Gas Journal*, Jul. 11, 1960, Vol. 58, No. 28, p. 71. In accordance with this technique, a low viscosity plastic is squeezed into well perforations at the water-oil contact to form an impermeable pancake or cylinder of plastic at the water-oil contact. The low viscosity plastic was forced at less than fracturing pressure into the pores of the formation.

Still another method of decreasing the ratio of gas and/or water produced along with oil in a well is described in U.S. Pat. No. 3,368,624 issued to Heuer et al. Here a foam plug is formed in situ in the path of the water. This foam plug is formed by injecting a foaming agent into a subterranean formation surrounding a wellbore and placing the well on production. Heuer et al. state that it is preferred that the foaming agent be injected so that it primarily enters the formation near the interface of the water- and oil-producing zones. More preferably, the foaming agent is injected directly into the water zone.

Although several methods have addressed the problem of water coning, none of these methods are directed to preventing water coning or water-influx where the hydrocarbon-bearing formation is water sensitive. Where this formation exists it is inadvisable to block fluid flow with a water-based profile control gel. This is inadvisable because leak-off of water from a water-based gel system could contact and damage an oil- or gas-producing but water-sensitive hydrocarbon zone. Such leak-off is difficult to avoid in the very common circumstances in which the water-sensitive, hydrocarbon-producing zone and the water-influx zone are both communicating with the wellbore via separate sets of perforations. Damage would result because of a catastrophic loss of permeability when the water-sensitive zone is exposed to water.

Therefore, what is needed is a method to prevent water coning or water-influx when the hydrocarbon-bearing formation is water-sensitive.

SUMMARY

This invention is directed to a method for preventing damage to a water-sensitive hydrocarbonaceous fluid-producing zone of the formation. The formation is penetrated by a well which has a water-influx problem at another zone. In the practice of this invention, a petroleum mixture capable of forming a solid gel is injected into a production well. The production well communicates with a water-sensitive hydrocarbonaceous zone in the formation via perforations in the well. The mixture which is injected into the hydrocarbonaceous zone is a petroleum-forming gel mixture which forms a solid gel that degrades over a designated period of time. When the mixture forms a solid gel, the gel closes pores in the water-sensitive hydrocarbonaceous fluid-producing zone. Once the water-sensitive hydrocarbonaceous fluid-producing zone is closed, entry of other fluids into the water-sensitive hydrocarbonaceous zone from the well is precluded.

Once the solid gel is formed in the water-sensitive hydrocarbonaceous area to the extent desired, an aqueous gel-forming mixture is injected into a water influx zone of the formation. Since the water-sensitive hydrocarbonaceous fluid-producing zone has a solid gel, the aqueous gel-forming mixture cannot enter that zone. The aqueous gel-forming mixture is allowed to remain in the water-influx zone for a time sufficient to form a solid gel therein. The solid gel which is formed in the water-influx zone is sufficient to preclude fluid entry either into or out of the water-influx zone.

The hydrocarbonaceous solid gel contained in the water-sensitive hydrocarbonaceous fluid-producing zone is permitted to degrade. Upon degradation, the solid gel liquifies and flows into the well along with hydrocarbonaceous fluids from the water-sensitive zone. The well is then allowed to continue producing hydrocarbonaceous fluids to the surface. Since water can no longer enter the well from the water-influx zone which is closed by a solid gel, hydrocarbon-aceous fluids which are produced to the surface are substantially water-free.

Therefore, it is an object of this invention to prevent catastrophic loss of permeability of the water-sensitive oil producing zone by using a petroleum-based gel mixture to temporarily close said zone so as to preclude entry therein of a water-based gel mixture which is later injected into a water-influx zone.

It is another object of this invention to decrease production costs by substantially reducing the amount of water produced with hydrocarbonaceous fluids from the well.

It is yet another object of this invention to use a water-based gel mixture in the water influx zone so as to obtain a more stable solid gel.

PREFERRED EMBODIMENT

Figure 1:
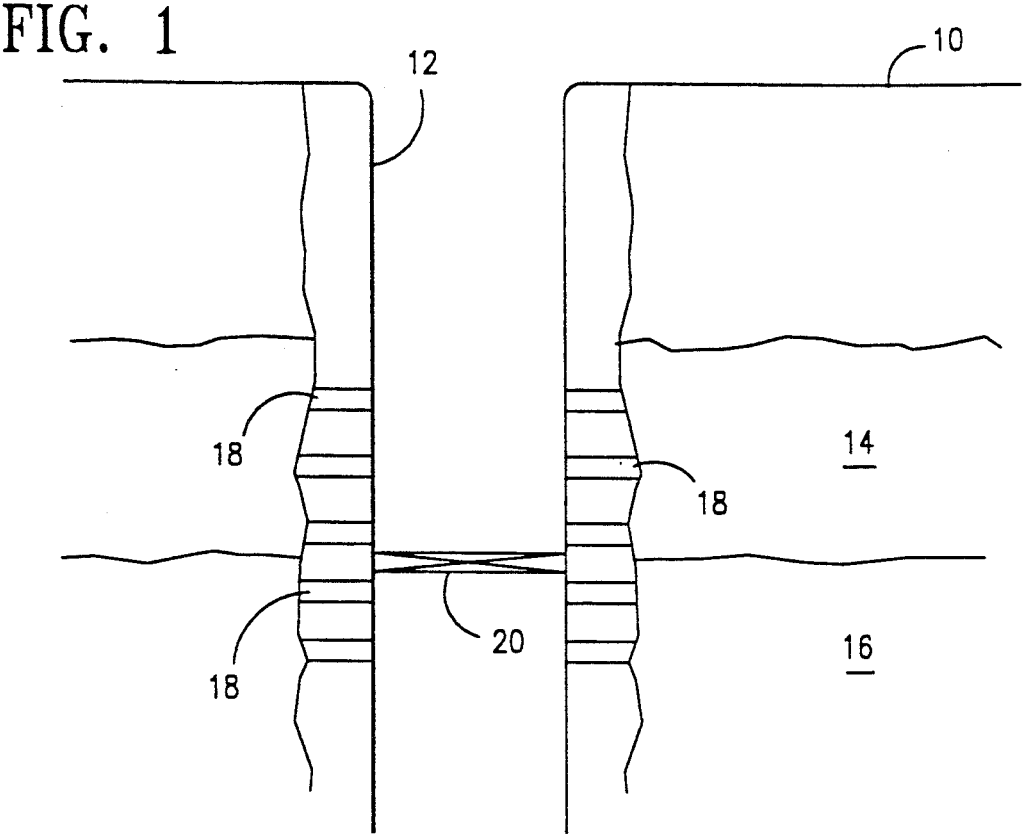
FIG. 1 is a schematic representation of a well penetrating a formation which well communicates with a water-sensitive oil producing zone and a water influx zone.

In the practice of this invention, as shown in FIG. 1, well 12 penetrates formation 10. Well 12 contains perforations 18. These perforations allow fluid communication by the well with water-sensitive hydrocarbonaceous fluid-containing zone 14. Fluid communication is also obtained by perforations 18 with water-influx zone 16. In order to prevent fluid entry into water-sensitive zone 14, a petroleum-based gel mixture sufficient to form a solid hydrophobic gel in situ is injected into zone 14. The gel mixture contains a composition which degrades at formation conditions. The petroleum-based gel mixture is allowed to form a solid gel in the water-sensitive hydrocarbonaceous fluid-producing zone. This formed solid gel precludes fluids from entering zone 14 from well 12 via perforations 18. The gel is allowed a time sufficient to form a solid gel. In order to prevent the petroleum-based gel mixture from entering water-influx zone 16, a mechanical packer 20 can be used. This mechanical packer may not be necessary in those situations where the permeability of water-influx zone 16 is such that a rehealable and shearable aqueous gel can be injected into water-influx zone 16 first when water-sensitive zone 14 is such that the aqueous gel cannot enter it.

Once a solid gel has been formed in water-sensitive zone 14, packer 20 is removed from well 12. Thereafter, an aqueous gel-forming mixture capable of forming a solid hydrophilic gel is injected into water-influx zone 16 via perforations 18. Since a solid hydrophobic gel is formed in water-sensitive hydrocarbonaceous fluid-producing zone 14, the aqueous gel mixture cannot enter that zone. Afterwards, a solid hydrophilic gel is formed in water-influx zone 16.

Figure 2:
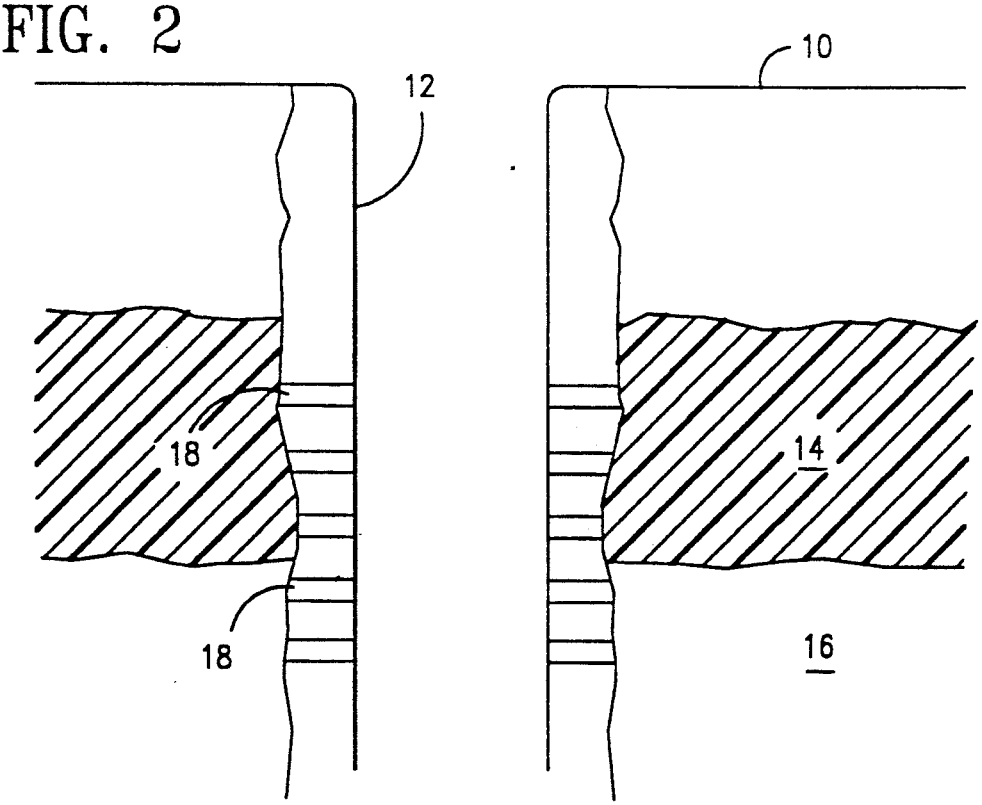
FIG. 2 is a schematic representation of a well where the water-sensitive oil producing zone has been filled with a solid petroleum gel.
Figure 3:
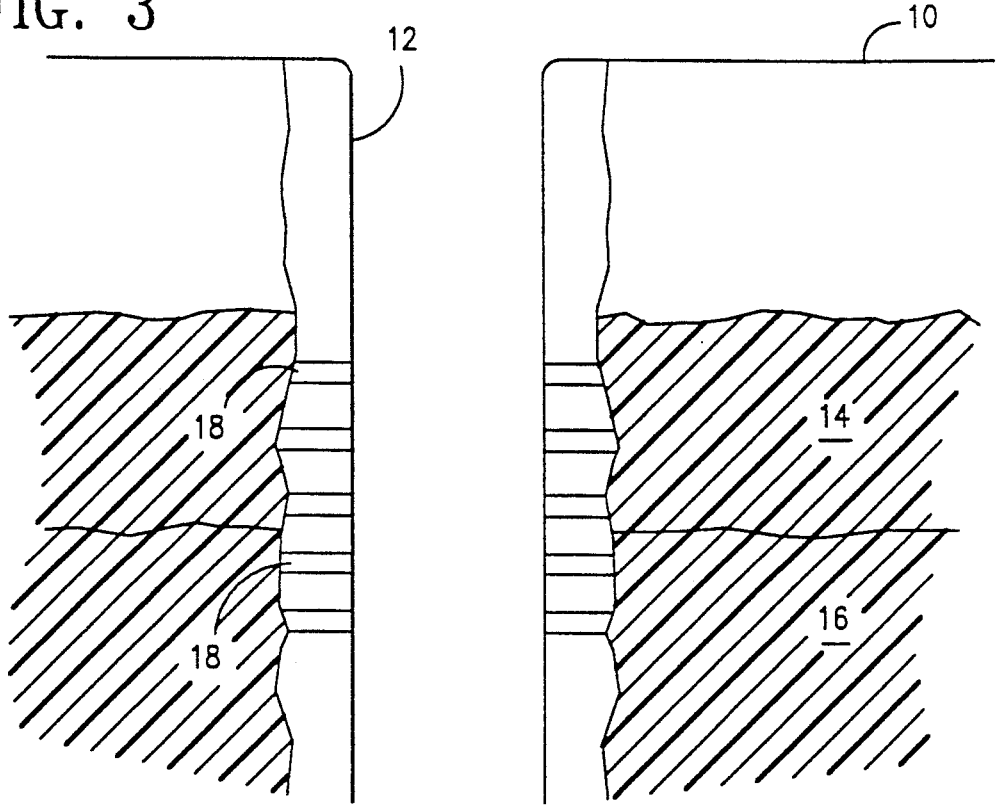
FIG. 3 is a representation which depicts a water-influx zone and a water-sensitive zone which are closed with a solid gel.
Figure 4:
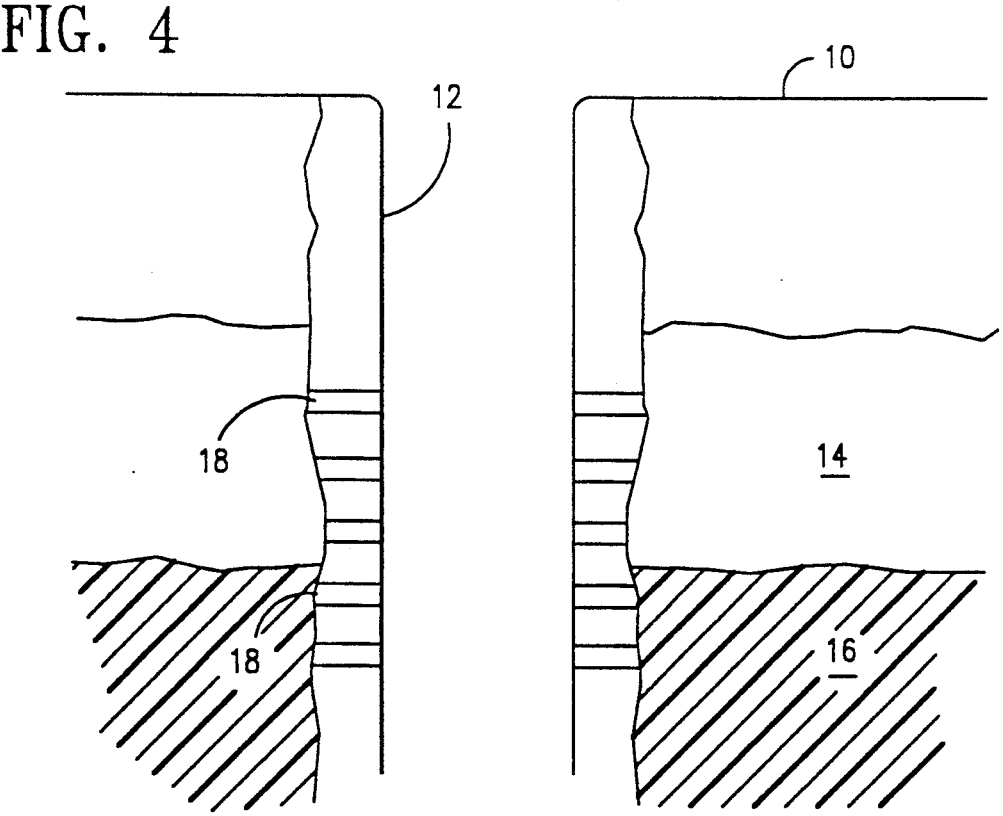
FIG. 4 represents schematically, unplugged water-sensitive zone and the water-influx zone containing a solid hydrophobic gel.

FIG. 2 illustrates formation of the solid petroleum-based gel in water-sensitive zone 14. After the aqueous gel-forming mixture has remained in water influx zone 16 for a time sufficient to form a solid hydrophobic gel, the solid petroleum-based gel formed in water-sensitive zone 14 is allowed to degrade due to heat and contact with hydrocarbons existing in the formation. Under conditions existing in the formation, the petroleum-based gel degrades into an elastic liquid in about 2 to about 3 days. After the petroleum-based solid gel formed in zone 14 has degraded, hydrocarbonaceous fluids are allowed to flow into well 12 where they are subsequently produced to the surface. Because water-influx zone 16 remains closed with the solid aqueous gel, water cannot enter wellbore 12. Thereafter, hydrocarbonaceous fluids which are produced to the surface are substantially water-free.

A petroleum-based gel-forming mixture which can be used herein is made from decalin which is used as the base hydrocarbon. Into the decalin is placed a long chain aluminium soap. Preferred soaps include aluminium dilaurate and aluminum distearate. A lauryl amine such as lauryldiamethylamine can be utilized when combined with an aluminum soap. The soap is placed into the decalin in an amount sufficient to form a gel in the presence of a phenolic co-surfactant. The soap is added into decalin in an amount of about 10 to about 100 grams per liter, preferably about 60 grams per liter. A gel as described appears in a book entitled *Elastic Liquids*, (1964), page 237, that was authored by A. S. Lodge.

Meta-cresol is the phenolic co-surfactant preferred for use herein. Other co-surfactants which can be utilized include resorcinol and phenol. Depending on the co-surfactant selected, the amount of co-surfactant which can be used can vary from about 5 to about 30 milliliters per liter. However, when meta-cresol is used, 15 milliliters per liter is preferred. Once the soap and co-surfactant have been added to the decalin, the materials are allowed sufficient time to thoroughly mix. The petroleum-based mixture is then injected into wellbore 12 where it forms a solid gel in water-sensitive zone 14.

Although decalin is preferred, other liquid hydrocarbons can be used. These include lease crude, diesel fuel, and decanol.

U.S Pat. Nos. 2,906,338, 2,978,024, 3,498,380, and 3,064,730 teach other methods for forming hydrocarbon gels. These patents are hereby incorporated by reference herein. The concentration of soap and co-surfactant utilized should be adjusted so as to obtain the optimum solid gel for flow conditions anticipated in water-sensitive zone 14.

An aqueous gel composition which can be used in water-influx zone 16 to form a solid hydrophilic gel is discussed in U.S. Pat. No. 4,716,966. This patent issued to Shu on Jan. 5, 1988 and is hereby incorporated by reference herein. The gel disclosed for use therein comprises a transitional metal cross-linked (e.g. Cr, Al, Zr, etc.) aminoplast resin which is reacted with xanthan polymer, cellulose, cellulose derivatives, and other polysaccharide biopolymers having at least one functional group selected from a member of the group consisting of an amine, an amide, a carboxyl, a hydroxyl, or a thiol. The amino resin polysaccharide biopolymer reaction does not require a catalyst or a particular pH requirement for the preparation of said composition of matter. The gel which is formed by the cross-linking of the metal and the aminoplast resin reacted polymers forms a more thermally stable gel and is useful in producing hydrocarbonaceous fluids from a reservoir while greatly improving the sweep efficiency of driving fluids.

Once the aqueous gellable composition has formed a solid gel, the petroleum gel degrades and flows into the well. The well is then put back onto production and hydrocarbon-aceous fluids are removed from the water-sensitive zone 14. Water cannot enter the well from water-influx zone 16 because it is plugged with the solid aqueous gel. Being plugged in this manner prevents additional water from flowing in from zone 16 so as to preclude and substantially reduce the amount of water which is produced to the surface with the hydrocarbonaceous fluids.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. A method for preventing damage to a water-sensitive hydrocarbonaceous fluid-producing zone of a formation which is penetrated by a well which has a water-influx problem comprising:
   a) injecting into the well at a water-sensitive hydrocarbonaceous fluid-producing zone a mixture capable of forming a solid hydrophobic gel in situ sufficient to temporarily close pores in said zone;
   b) allowing the mixture from step a) to remain in the water-sensitive zone for a time sufficient to form a solid hydrophobic gel so as to preclude fluid entry into said zone;
   c) injecting into the well at a water-influx zone an aqueous gel mixture capable of forming a substantially solid permanent hydrophilic gel in the water-influx zone so as to preclude fluid entry into said zone; and
   d) allowing the mixture from step c) to form a solid hydrophilic gel sufficient to preclude fluid entry into the water-influx zone.

2. The method as recited in claim 1 where the well is a production well.

3. The method as recited in claim 1 where a packer is placed in the well prior to injecting a petroleum-based gel-forming mixture into the water-sensitive hydrocarbonaceous fluid-producing zone of step a) which mixture forms a solid hydrophobic gel.

4. The method as recited in claim 1 where after step d) substantially water-free hydrocarbonaceous fluids are produced from the water-sensitive zone of the formation.

5. The method as recited in claim 1 where in step b) the solid hydrophobic gel comprises a solid petroleum gel which degrades into an elastic liquid in from about 2 to 3 days.

* * * * *